(12) United States Patent
Condorelli et al.

(10) Patent No.: US 6,556,495 B2
(45) Date of Patent: Apr. 29, 2003

(54) 2-D FIFO MEMORY HAVING FULL-WIDTH READ/WRITE CAPABILITY

(75) Inventors: Vincenzo Condorelli, Poughkeepsie, NY (US); Nihad Hadzic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/901,864

(22) Filed: Jul. 9, 2001

(65) Prior Publication Data

US 2003/0053367 A1 Mar. 20, 2003

(51) Int. Cl.⁷ .............................................. G11C 7/00
(52) U.S. Cl. ...................................... 365/221; 365/239
(58) Field of Search ................................. 365/221, 239, 365/219, 230.03; 711/118, 119, 120

(56) References Cited

U.S. PATENT DOCUMENTS

| | | | | |
|---|---|---|---|---|
| 4,823,321 A | * | 4/1989 | Aoyama ................. 365/189.05 |
| 4,878,197 A | | 10/1989 | Nay et al. .................... 364/900 |
| 5,014,187 A | | 5/1991 | Debize ........................ 364/200 |
| 5,134,702 A | | 7/1992 | Charych et al. ............. 395/500 |
| 5,151,999 A | | 9/1992 | Murucco et al. ............ 395/800 |
| 5,228,002 A | * | 7/1993 | Huang ......................... 365/221 |
| 5,274,600 A | * | 12/1993 | Ward et al. .................. 365/221 |
| 5,291,453 A | * | 3/1994 | Aota et al. .................. 365/221 |
| 5,333,294 A | | 7/1994 | Schnell ....................... 395/425 |
| 5,388,074 A | * | 2/1995 | Buckenmaier ............... 365/239 |
| 5,471,583 A | * | 11/1995 | Au et al. ................. 365/189.01 |
| 5,521,876 A | * | 5/1996 | Hattori et al. ............... 365/221 |
| 5,594,927 A | | 1/1997 | Lee et al. .................... 395/886 |
| 5,701,517 A | | 12/1997 | Carpenter ................... 395/886 |
| 5,721,957 A | | 2/1998 | Huang et al. ............... 395/886 |
| 5,781,918 A | | 7/1998 | Lieberman et al. ............ 711/5 |
| 5,860,027 A | | 1/1999 | Leyer et al. ................ 395/886 |
| 5,974,516 A | | 10/1999 | Qureshi ...................... 711/171 |
| 6,074,339 A | | 4/2000 | Su et al. ....................... 710/56 |

* cited by examiner

Primary Examiner—Tan T. Nguyen
(74) Attorney, Agent, or Firm—Andrew J. Woinicki, Jr.; Cantor Colburn LLP (57) ABSTRACT

An apparatus and method is disclosed for selecting data in a FIFO memory array made up of a plurality of memory cells arranged in rows and columns, where each row of cells has an associated number of word lines selectively addressable by an associated row address, and each column of cells has an associated bit line that provides access to the memory cells of the associated column as enabled by the respective word lines; and the memory array includes an address decoder having an address input for receiving an input address for selecting word lines in accordance with the input address, and a programmable-width vertical pointer for providing read and write input addresses to the address input of the address decoder during associated read and write operations of the memory array, where the programmable-width vertical pointer modifies the read and write addresses during operations of the memory array and provides a FIFO memory functionality.

27 Claims, 5 Drawing Sheets

2-D FIFO MEMORY HAVING FULL-WIDTH READ/WRITE CAPABILITY

BACKGROUND

There are a variety of ways to organize and access data in integrated memories. Such memory access techniques include Random Access, Last In First Out ("LIFO"), and First In First Out ("FIFO"). In FIFO memories, the generally older data (first in) is released (first out) before the generally newer data is released. Such FIFO memories are generally used in data communications and digital processing systems.

FIFO integrated memories generally have a fixed width chosen in accordance with a given data width requirement. Accordingly, different applications having different data widths typically require different FIFO memories for matching the different data width requirements.

SUMMARY

This disclosure presents an apparatus and method for selecting data in a FIFO memory array made up of a plurality of memory cells arranged in rows and columns, where each row of cells has an associated number of word lines selectively addressable by an associated row address, and each column of cells has an associated bit line that provides access to the memory cells of the associated column as enabled by the respective word lines; and the memory array includes an address decoder having an address input for receiving an input address for selecting word lines in accordance with the input address, and a programmable-width vertical pointer for providing read and write input addresses to the address input of the address decoder during associated read and write operations of the memory array, where the programmable-width vertical pointer modifies the read and write addresses during operations of the memory array and provides a FIFO memory functionality.

BRIEF DESCRIPTION OF THE DRAWINGS

The present disclosure will be better understood, and its numerous features and advantages will become apparent to those skilled in the pertinent art by referencing the accompanying drawings, wherein like elements are numbered alike in the several figures, in which.

DETAILED DESCRIPTION

Figure 1:
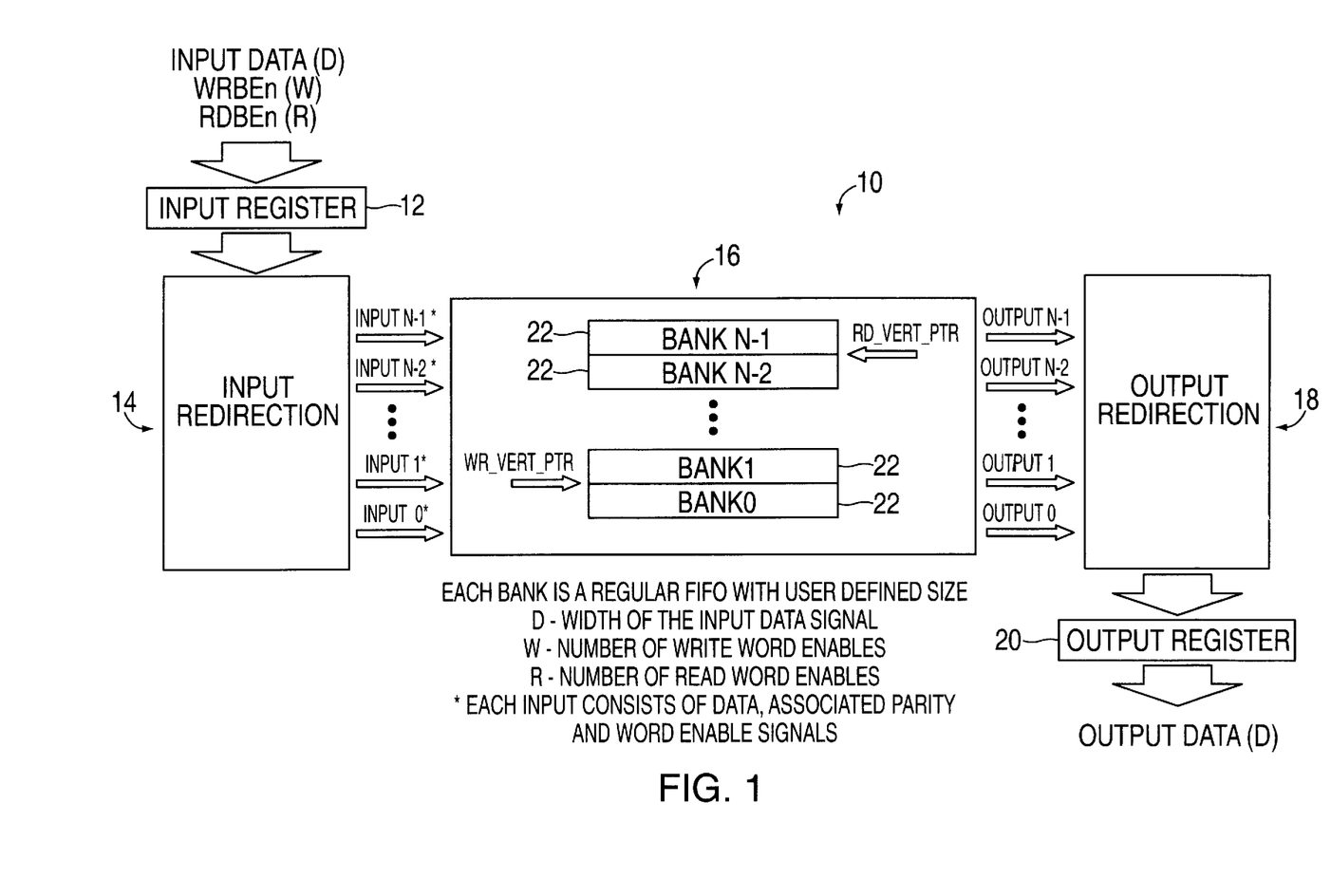
FIG. 1 is a schematic block diagram of a 2-D FIFO integrated memory device.

As shown in FIG. 1, reference numeral 10 generally designates a two-dimensional FIFO integrated memory device. The 2-D FIFO integrated memory device 10 includes an input register 12 for receiving input data, which is coupled to an input redirection unit 14 for redirecting the received data to the appropriate location in a memory array 16. The memory array 16 is coupled, in turn, to an output redirection unit 18, which is itself coupled to an output register 20 for providing the output data.

The memory array 16 includes a number (N) of banks 22 of single-dimensional memory, arranged as the individual rows of the memory array 16. Each bank is a regular single-dimensional FIFO having a user-defined size where D is the width of the data signal, W is the number of write word enables, and R is the number of read word enables. Each input also includes parity bits associated with the data and word enable signals.

Figure 2:
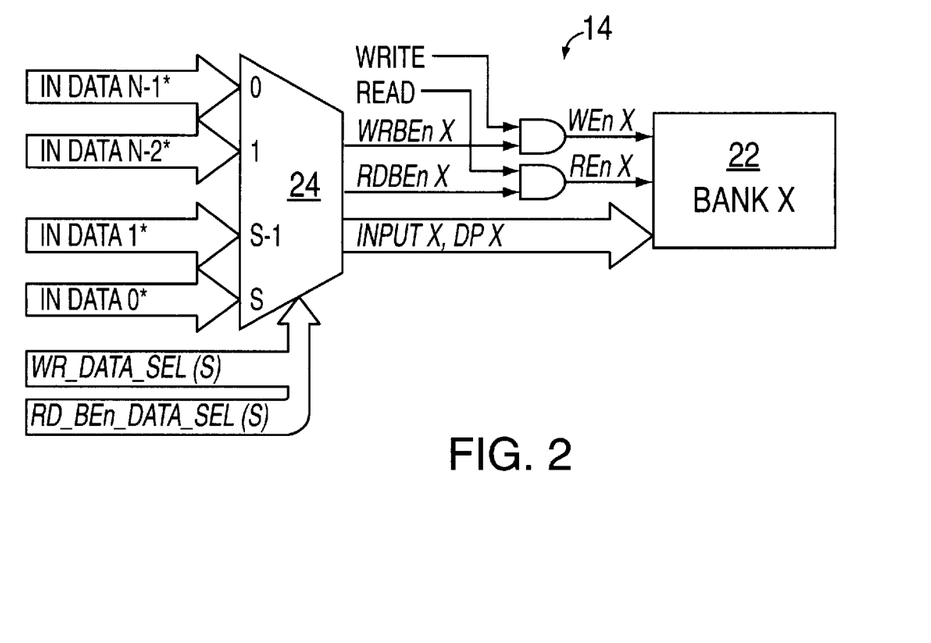
FIG. 2 is a schematic block diagram of an input redirection unit of the 2-D FIFO integrated memory device of FIG. 1.

Turning now to FIG. 2, a portion of the input redirection unit 14 of FIG. 1 is shown in greater detail. The portion shown is repeated for each bank, and includes a multiplexer ("MUX") 24 for receiving the input data and sending the bits of the data to the associated bank 22 in accordance with the MUX select signals in the following tables and equations:

| | SELECT (0:S-1, S = $\log_2$ N) | | | | | | |
|---|---|---|---|---|---|---|---|
| | 0 | 1 | 2 | ... | S-3 | S-2 | S-1 |
| BANK N – 1 | $D_{N-1}$ | $D_{N-2}$ | $D_{N-1}$ | ... | D2 | D1 | D0 |
| BANK N – 2 | $D_{N-2}$ | $D_{N-3}$ | $D_{N-4}$ | ... | D1 | D0 | $D_{N-1}$ |
| BANK N – 3 | $D_{N-3}$ | $D_{N-4}$ | $D_{N-1}$ | ... | D0 | $D_{N-1}$ | $D_{N-2}$ |
| . | . | . | . | | . | . | . |
| . | . | . | . | | . | . | . |
| BANK 2 | D2 | D1 | D0 | ... | D5 | D4 | D3 |
| BANK 1 | D1 | D0 | $D_{N-1}$ | ... | D4 | D3 | D2 |
| BANK 0 | D0 | $D_{N-1}$ | $D_{N-2}$ | ... | D3 | D2 | D1 |

WR_DATA_SEL <= WR_EXTRA_OFFSET · WR_VERT_PTR
RD_BEN_DATA_SEL <= RD_BEN_EXTRA_OFFSET · RD_VERT_PTR
WR_VERT_PTR IS INCREMENTED BY THE NUMBER OF WORDS WRITTEN IN THE FIFO
· "EACH IN DATA X" CONSISTS OF A CORRESPONDING DATA W OF PARITY BIT RDBEnX AND WRBEnX.

| WR_EXTRA_OFFSET | POSITION OF FIRST 1 IN WR_BEn |
|---|---|
| 0 | 0 |
| N-1 | 1 |
| N-2 | 2 |
| N-3 | 3 |
| 3 | N-3 |
| 2 | N-2 |
| 1 | N-1 |

| RD_BEN_EXTRA_OFFSET | POSITION OF FIRST 1 IN RD_BEn |
|---|---|
| 0 | 0 |
| N-1 | 1 |
| N-2 | 2 |
| N-3 | 3 |
| 3 | N-3 |
| 2 | N-2 |
| 1 | N-1 |

Figure 3:
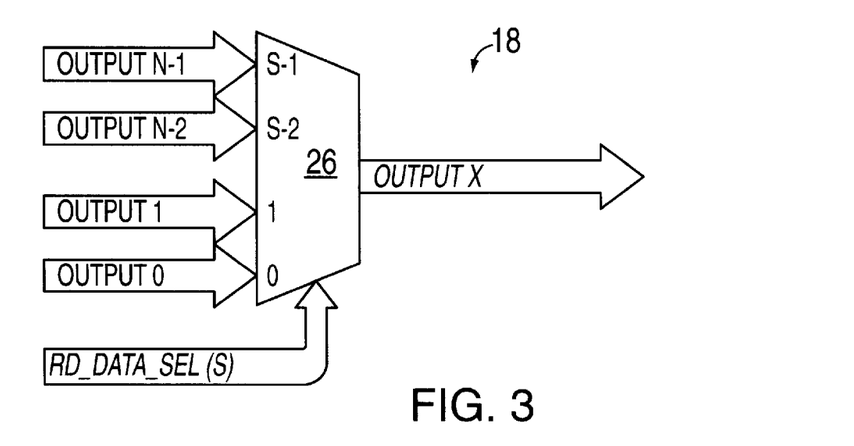
FIG. 3 is a schematic block diagram of an output redirection unit of the 2-D FIFO integrated memory device of FIG. 1.

With reference to FIG. 3, a portion of the output redirection unit 18 of FIG. 1 is shown in greater detail. The portion shown is repeated for each bank, and includes a MUX 26 for receiving the output data from the associated bank 22 and sending the bits of the data to the output register 20 of FIG. 1 in accordance with the MUX select signals in the following tables and equations:

| SIGNIFICANT | SELECT (0:S-1, S = log₂ N) | | | | | | |
| --- | --- | --- | --- | --- | --- | --- | --- |
| RANGE | 0 | 1 | 2 | ... | S-3 | S-2 | S-1 |
| N-1 | $D_{N-1}$ | $D_{N-2}$ | $D_{N-3}$ | ... | D2 | D1 | D0 |
| N-2 | $D_{N-2}$ | $D_{N-3}$ | $D_{N-4}$ | ... | D1 | D0 | $D_{N-1}$ |
| N-3 | $D_{N-3}$ | $D_{N-4}$ | $D_{N-5}$ | ... | D0 | $D_{N-1}$ | $D_{N-2}$ |
| . | . | . | . | . | . | . | . |
| . | . | . | . | . | . | . | . |
| . | . | . | . | . | . | . | . |
| 2 | D2 | D1 | D0 | ... | D5 | D4 | D3 |
| 1 | D1 | D0 | $D_{N-1}$ | ... | D4 | D3 | D2 |
| 0 | D0 | $D_{N-1}$ | $D_{N-2}$ | ... | D3 | D2 | D1 |

RD_DATA_SEL <= RD_VERT_PTR - RD_EXTRA_OFFSET
RD_VERT_PTR IS INCREMENTED BY THE NUMBER OF WORDS READ FROM THE FIFO

| RD_EXTRA_OFFSET | POSITION OF FIRST 1 IN RD_BEn |
| --- | --- |
| 0 | 0 |
| 1 | 1 |
| 2 | 2 |
| 3 | 3 |
| . | . |
| . | . |
| . | . |
| N-3 | N-3 |
| N-2 | N-2 |
| N-1 | N-1 |

In operation, 2-D FIFO memories according to FIGS. 1 through 3 combine the features with an ability to store and read a selectable number of k-bit words per cycle without any performance or ease of use penalty, with k being a non-negative integer up to the width of the 2-D FIFO. The number of k-bit words, up to the depth of the 2-D FIFO, that are stored to and/or read from the 2-D FIFO for each clock cycle is controlled by appropriate read and write word enables such as those that are typically used in advanced microprocessor and peripheral busses, as known to those of ordinary skill in the pertinent art. The logic that controls the number of k-bit words stored or read is implemented by a mechanism where the word enables are traveling through the redirection logic with the associated data.

A 2-D FIFO contains N memory banks and each memory bank is itself a $2^n \times M$ "mini" FIFO similar to a regular single-dimensional FIFO, where n is the number of bits per word and M is the number of words. Data is written to a mini FIFO by activating its WRITE line. Similarly, data is read from the mini FIFO by activating its READ line.

A W-bit wide (W=log₂N) write vertical pointer (WR_VERT_PTR) points to the memory bank that will receive the next lowest significant word from the input. This pointer's value is incremented by the number of words written to the FIFO in the previous write sequence.

An R-bit wide (R=log₂N) read vertical pointer (RD_VERT_PTR) points to the memory bank that contains the byte that will be output as the lowest significant word. This pointer's value is incremented by the number of words read from the FIFO in the previous read sequence.

A 2-D FIFO is capable of redirecting any word "lane" to any memory bank in order to meet design specifications. This is achieved by using three banks of N N:1 multiplexers for the following signals:

Input data: Data is broken up in N groups of M bits and applied to the multiplexer inputs according to the block diagram. Each output is applied to a memory bank. Select (WR_DATA_SEL) for this MUX is calculated by adding the value of the write vertical pointer (WR_VERT_PTR) with an extra offset (WR_EXTRA_OFFSET), calculated according to the table defined above.

Write word enables (WRBEn): N write word enables are applied to the multiplexer inputs according to the block diagram. Each output is applied to a memory bank. Select is WR_DATA_SELECT, described above.

Read word enables (RDBEn): N read word enables are applied to the multiplexer inputs according to the block diagram. Each output is applied to a memory bank. Select (RD_BEN_DATA_SEL) for this MUX is calculated by adding the value of the read vertical pointer (RD_VERT_PTR) with an offset (RD_BEN_EXTRA_OFFSET), calculated according to the table defined above.

In addition to input redirection, a 2-D FIFO is able to redirect the output of memory banks to appropriate word lanes. This is achieved by a bank of N N:1 multiplexers. Outputs of memory banks are applied to the multiplexer inputs according to the block diagram. Multiplexer outputs are then combined into main FIFO output. Select (RD_DATA_SEL) for this MUX is calculated by subtracting the value of the extra offset (RD_EXTRA_OFFSET), calculated according to the table defined above, from the read vertical pointer (RD_VERT_PTR).

Thus, 2-D FIFOs according to the present disclosure may have immediate application to buffering and realignment of data on many industrial standard I/O busses (e.g., PCI bus).

The PCI bus standard, which supports both 32 and 64 bit bus widths, transfers 4 or 8 byte enables, respectively, with every 32 or 64 bits of data, respectively. These byte enables are used to determine which incoming bytes are valid. When using DMA to transfer data to or from system memory and the actual valid data is not aligned on 32 or 64-bit boundaries, respectively, the associated data transfer contains non-valid bytes. Current market implementation of PCI bridge chips are either forcing the system CPU to realign the data on a 64-bit boundary, for example, before starting the DMA transfer or they store in the receiving FIFO the actual value of the byte enable signals. The first case is causing a degradation of the system performance while the second case wastes memory space and discards non-valid bytes.

2-D FIFOs according to the present disclosure may also have immediate application to bus size matching, allowing the connection of two different width data busses. For example, since 2-D FIFOs can be filled one or two bytes at a time, without penalty, and emptied 4 bytes at a time, they provide a solution for efficiently loading a 32-bit target device using an 8-bit bus or a 16-bit bus. Data is loaded on one of three possible 16-bit boundaries and corresponding byte enables are activated. Data would then be read 32 bits at a time.

In addition, 2-D FIFOs according to the present disclosure may have immediate application to serial to parallel FIFO applications. If the size of the banks is set to $2^N \times 1$, then byte enables become bit enables and can be used to read and write individual bits. Serial data is connected to the input and only the bit enable line corresponding to the input signal is activated. A 2-D FIFO would then shift data internally without any need for user interaction. Data would then be read out of the 2D FIFO one word (or part of it) at a time.

2-D FIFOs according to the present disclosure may also have immediate application to parallel to serial FIFOs. This FIFO can be implemented in a manner similar to the previous serial to parallel example. Parallel data is loaded into the 2-D FIFO in the usual manner. Serial data is then read out 1 bit at a time, by activating only one bit enable line at a time. Unlike standard FIFOs, 2-D FIFOs cover both serial-to-parallel and parallel-to-serial versions with the same hardware.

Additionally, 2-D FIFOs according to the present disclosure may have immediate application to buffering the output of variable bit width devices. Certain devices, such as compression engines, generate outputs having variable quantities of bits. 2-D FIFOs may be used to assemble these outputs onto a desired fixed bus width.

Figure 4:
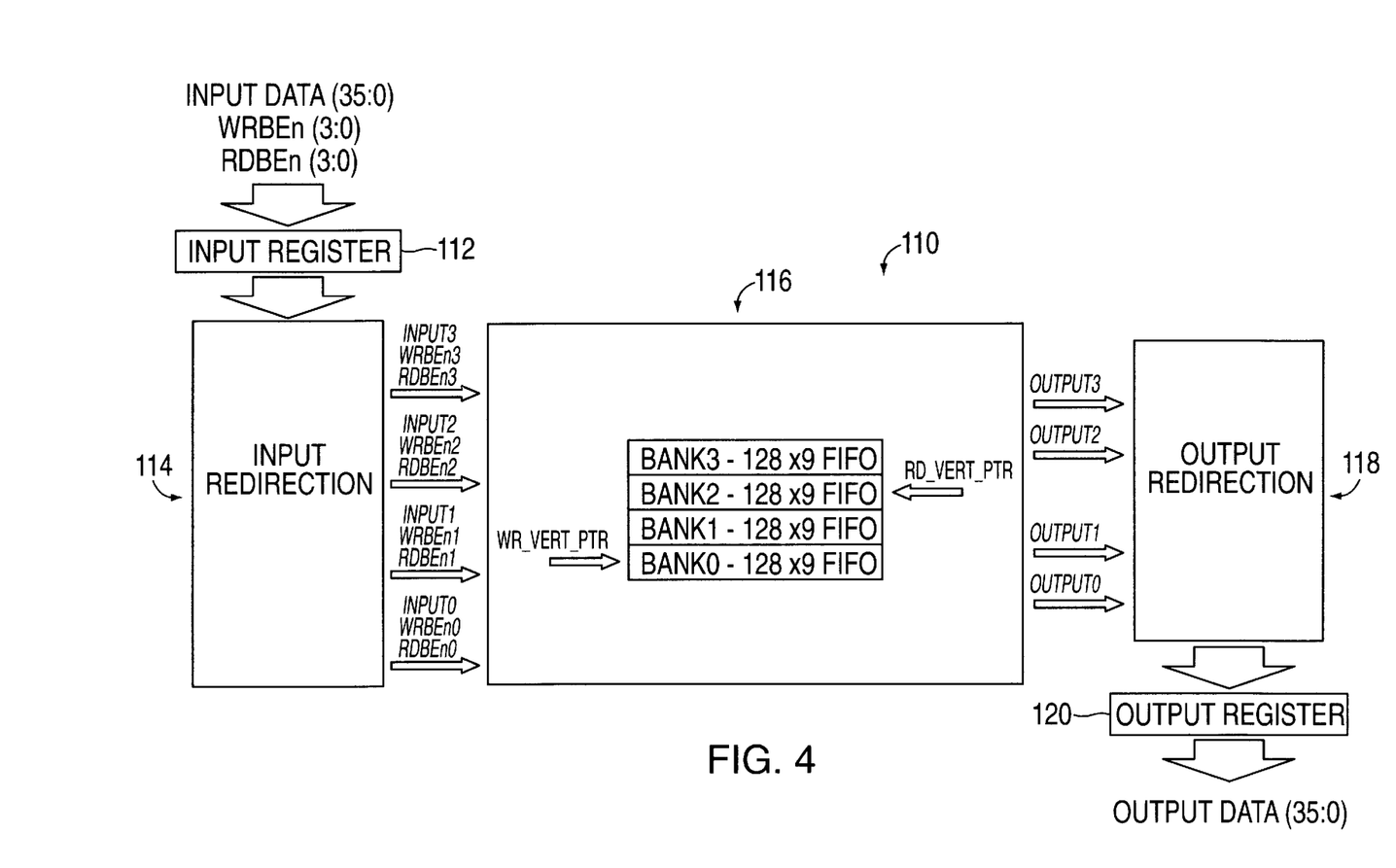
FIG. 4 is a schematic block diagram of a 2-D FIFO integrated memory device.

As shown in FIG. 4, reference numeral 110 generally designates a two-dimensional FIFO integrated memory device. The 2-D FIFO integrated memory device 110 includes an input register 112 for receiving input data, which is coupled to an input redirection unit 114 for redirecting the received data to the appropriate location in a memory array 116. The memory array 116 is coupled, in turn, to an output redirection unit 118, which is itself coupled to an output register 120 for holding the output data.

The memory array 116 includes four banks 122 of single-dimensional memory, arranged as the individual rows of the memory array 116. Each bank is a regular single-dimensional FIFO having a depth of 128 bytes and a width of 9 bits (8 data bits and a corresponding parity bit). The input data signal has a width of D=36 bits, a number of write word enables of W=4, and a number of read word enables of R=4.

Figure 5:
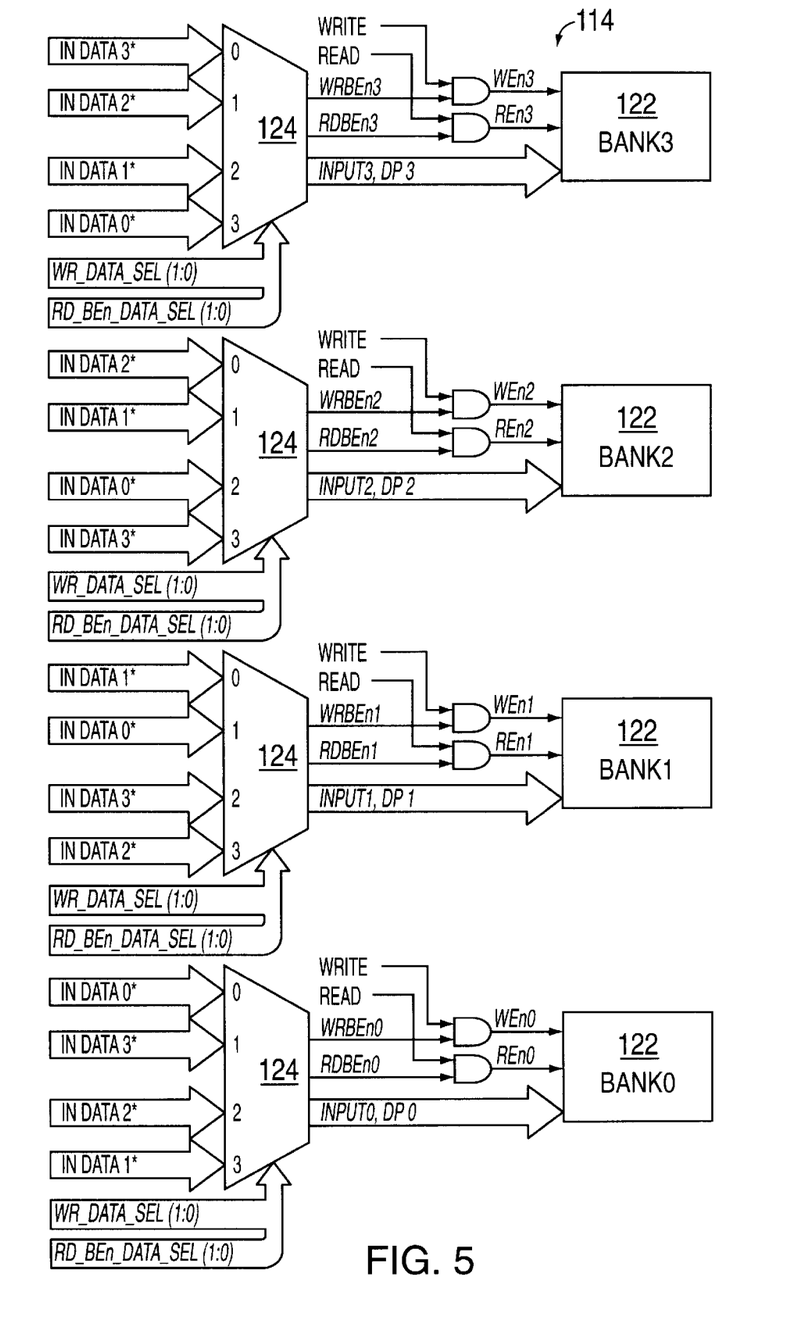
FIG. 5 is a schematic block diagram of an input redirection unit of the 2-D FIFO integrated memory device of FIG. 4.

Turning now to FIG. 5, the input redirection unit 114 of FIG. 4 is shown in greater detail. The input redirection unit 114 includes a multiplexer ("MUX") 24 for receiving the input data and sending the bits of the data to the associated bank 22 in accordance with the MUX select signals in the following equations and tables:

WR_DATA_SEL <= WR_EXTRA_OFFSET + WR_VERT_PTR
RD_BEN_DATA_SEL <= RD_BEN_EXTRA_OFFSET + RD_VERT_PTR
WR_VERT_PTR IS INCREMENTED BY THE NUMBER OF 1's IN WR (3:0) ON EVERY CLOCK EDGE

| WR_EXTRA_OFFSET | POSITION OF FIRST 1 IN WR_BEn |
|---|---|
| 0 | 0 |
| 3 | 1 |
| 2 | 2 |
| 1 | 3 |

| RD_BEN_EXTRA_OFFSET | POSITION OF FIRST 1 IN RD_BEn |
|---|---|
| 0 | 0 |
| 3 | 1 |
| 2 | 2 |
| 1 | 3 |

*EACH "IN DATA X" CONSISTS OF A CORRESPONDING DATA BY7 PARITY BIT, RDBEnX AND WRBEnX

Figure 6:
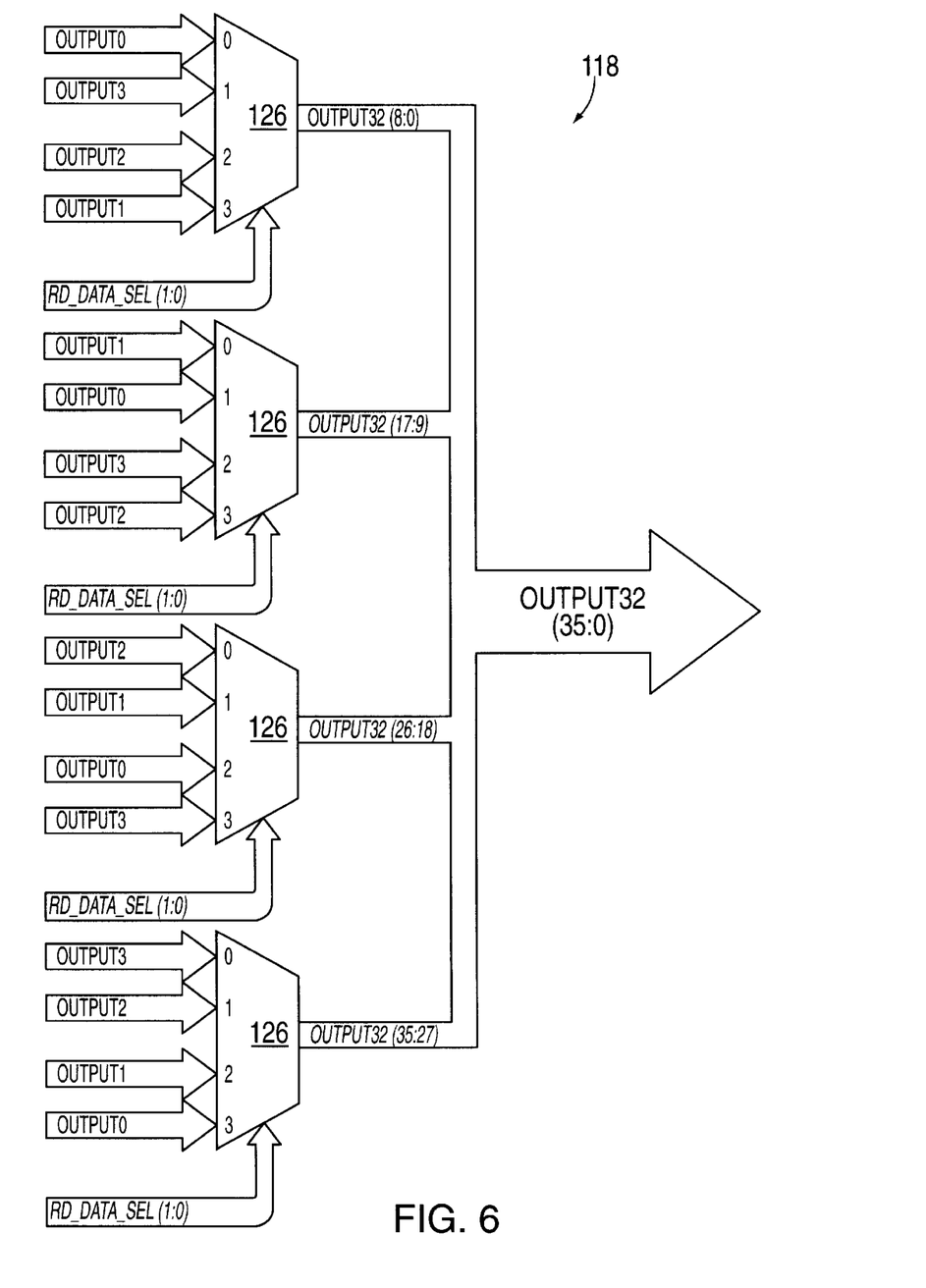
FIG. 6 is a schematic block diagram of an output redirection unit of the 2-D FIFO integrated memory device of FIG. 4.

With reference to FIG. 6, the output redirection unit 118 of FIG. 4 is shown in greater detail. The output redirection unit 118 includes a MUX 126 for receiving the output data from the associated bank 122 and sending the bits of the data to the output register 120 of FIG. 1 in accordance with the MUX select signals in the following equations and table:

RD_DATA_SEL <= RD_VERT_PTR − RD_EXTRA_OFFSET
RD_VERT_PTR IS INCREMENTED BY THE NUMBER OF 1's IN RD_(3:0) ON EVERY CLOCK EDGE

| RD_EXTRA_OFFSET | POSITION OF FIRST 1 IN RD_BEn |
|---|---|
| 0 | 0 |
| 1 | 1 |
| 2 | 2 |
| 3 | 3 |

In operation, the 2-D FIFO according to FIGS. 4 through 6 contains 4 memory banks and each memory bank is in itself a 128×9 mini FIFO. Data is written to a mini FIFO by activating the WRITE line corresponding to the particular mini FIFO. Similarly, data is read from the mini FIFO by activating the READ line. Each mini FIFO has EMPTY, NEAR_EMPTY, FULL and NEAR_FULL output lines that are used in the main 2-D FIFO.

A 2-bit write vertical pointer(WR_VERT_PTR) points to the memory bank that will receive the next lowest significant byte from the input. Its value is incremented by the number of bytes written to the FIFO in the previous write sequence.

A 2-bit read vertical pointer (RD_VERT_PTR) points to the memory bank that contains the byte that will be output as the lowest significant byte. Its value is incremented by the number of bytes read from the FIFO in the previous read sequence.

The 2-D FIFO is able to redirect any byte lane to any memory bank in order to behave according to a design specification. This is achieved by using three banks of four 4:1 multiplexers for the following signals:

Input data(including the parity bit): Data is broken up in four groups of 9 bits and applied to the multiplexer inputs according to the block diagram. Each output is applied to a memory bank. A select signal (WR_DATA_SEL) for this MUX is calculated by adding the value of the write vertical pointer (WR_VERT_PTR) to an extra offset (WR_EXTRA_OFFSET), calculated according to the table defined above.

Write byte enables (WRBEn): Four write byte enables are applied to the multiplexer inputs according to the block diagram. Each output is applied to a memory bank. The select signal is WR_DATA_SELECT, described above.

Read byte enables (RDBEn): Four read byte enables are applied to the multiplexer inputs according to the block diagram. Each output is applied to a memory bank. Select (RD_BEN_DATA_SEL) for this MUX is calculated by adding the value of the read vertical pointer(RD_VERT_PTR) with an offset (RD_BEN_EXTRA_OFFSET), calculated according to the table defined above.

In addition to input redirection, the 2-D FIFO 110 is able to redirect the output of memory banks to appropriate byte lanes. This is achieved by the bank of four 4:1 multiplexers. Outputs of the memory banks are applied to the multiplexer inputs according to the block diagram. Multiplexer outputs are then combined into a main FIFO output at the output register. Select (RD_DATA_SEL) for this MUX is calculated by adding the value of the read vertical pointer (RD_VERT_PTR) to an extra offset (RD_EXTRA_OFFSET), calculated according to the table defined above.

The above-described features are generally transparent to the user, which makes such 2-D FIFOs fully back compatible with standard FIFOs. The greater flexibility and simplicity of the implementation makes the 2-D FIFO a more flexible and desirable choice for many applications, such as, for example, data buffering and data re-alignment on industrial standard busses like PCI-X and PCI, bus size matching, and serial-to-parallel or parallel-to-serial FIFO applications.

An advantage of the above-described method is that clock cycles may be saved when accessing the FIFO memory whenever the actual data width is less than or equal to the width of the FIFO memory.

While exemplary embodiments have been shown and described, those of ordinary skill in the pertinent art may make various modifications and substitutions thereto without departing from the spirit and scope of the present disclosure. Accordingly, it is to be understood that the present disclosure has been made by way of illustration only, and such illustrations and embodiments as have been disclosed herein are not to be construed as limiting to the claims.

What is claimed is:

1. A method of processing data in FIFO memory, the method comprising:
   receiving a first group of data;
   directing different portions of the first group of data to different one-dimensional FIFO memory bank, the different one-dimensional FIFO memory barks being part of an array of one-dimensional FIFO memory banks;
   updating a write pointer to indicate a next one-dimensional FIFO memory bank in the array of one-dimensional FIFO memory banks;
   receiving a second group of data; and
   directing at least a portion of the second group of data to the next one-dimensional FIFO memory bank indicated by the write pointer.

2. The method of claim 1, wherein the directing different portions of the first group of data to different one-dimensional FIFO memory banks include:
   determining valid portions of the first group of data; and
   directing only the valid portions of the first group of data to the one-dimensional FIFO memory banks.

3. The method of claim 2, wherein the first group of data includes enable bits and the valid portions of the first group of data are determined using the enable bits.

4. The method of claim 1, wherein each one-dimensional FIFO memory bank has an associated multiplexer, and the directing different portions of the first group of data to different one-dimensional FIFO memory banks includes:
   directing all of the different portions to each multiplexer; and
   for each multiplexer, selecting from the different portions a portion to be directed to the one-dimensional FIFO memory bank associated with the multiplexer.

5. The method of claim 4, wherein the first group of data is broken up into N different portions of M bits each, the array of one-dimensional FIFO memory banks includes N one-dimensional FIFO memory banks, and each multiplexer includes N inputs for the N different portions.

6. The method of claim 1, further comprising:
   reading the different portions of the first group of data from the different one-dimensional FIFO memory banks; and
   outputting the different portions of the first group of data.

7. The method of claim 6, further comprising:
   after the reading, updating a read pointer to indicate the next one-dimensional FIFO memory bank in the array of one-dimensional FIFO memory banks.

8. The method of claim 6, wherein each one-dimensional FIFO memory bank has an associated multiplexer, and the outputting the different portions of the first group of data includes:
   directing all of the different portions to each multiplexer; and
   for each multiplexer, selecting from the different portions a portion to be output.

9. The method of claim 6, wherein the first group of data has a number of bits and the different portions are output in groups of data each having a different number of bits.

10. The method of claim 6, wherein the first group of data is input in one of serial and parallel fashion, and the different portions are output in the other of serial and parallel fashion.

11. The method of claim 1, wherein the first group of data and the second group of data have a different number of bits.

12. The method of claim 1, wherein each of the different portions comprises a byte of data.

13. The method of claim 1, wherein the first group of data is broken up into N different portions of M bits each, and the array of one-dimensional FIFO memory banks includes N one-dimensional FIFO memory banks.

14. A two-dimensional FIFO memory comprising:
   an array of one-dimensional FIFO memory banks;
   an input redirection unit, the input redirection unit receives a group of data and directs different portions of the group of data to different one-dimensional FIFO memory banks in the array of FIFO memory banks; and
   a write pointer indicating a one-dimensional FIFO memory bank in the array of one-dimensional FIFO memory banks to which the input redirection unit is to direct at least a portion of data.

15. The two-dimensional FIFO of claim 14, further comprising:
   an output redirection unit, the output redirection unit reads the different portions of the group of data from the different one-dimensional FIFO memory banks and outputs the different portions.

16. The two-dimensional FIFO of claim 15, further comprising:
   a read pointer indicating a one-dimensional FIFO memory bank in the array of one-dimensional FIFO memory banks from which the output redirection unit is to read.

17. The two-dimensional FIFO of claim 15, wherein the output redirection unit includes:
   a plurality of multiplexers, each multiplexer in the plurality of multiplexers being associated with a one-dimensional FIFO memory bank, the output redirection unit directs all of the different portions to each multiplexer, and, for each multiplexer, selects from the different portions a portion to be output.

18. The two-dimensional FIFO of claim 15, wherein the group of data has a number of bits and the different portions are output in groups of data each having a different number of bits.

19. The two-dimensional FIFO of claim 15, wherein the group of data is input in one of serial and parallel fashion, and the different portions are output in the other of serial and parallel fashion.

20. The two-dimensional FIFO of claim 14, wherein the input redirection unit determines valid portions of the group of data and directs only the valid portions of the group of data to the one-dimensional FIFO memory banks.

21. The two-dimensional FIFO of claim 20, wherein the group of data includes enable bits and the valid portions of the group of data are determined using the enable bits.

22. The two-dimensional FIFO of claim 14, wherein the input redirection unit includes:
a plurality of multiplexers, each multiplexer in the plurality of multiplexers being associated with a one-dimensional FIFO memory bank, the input redirection unit directs all of the different portions to each multiplexer and, for each multiplexer, selects from the different portions a portion to be directed to the one-dimensional FIFO memory bank associated with the multiplexer.

23. The two-dimensional FIFO of claim 22, wherein the group of data is broken up into N different portions of M bits each, the array of one-dimensional FIFO memory banks includes N one-dimensional FIFO memory banks, and each multiplexer includes N inputs for the N different portions.

24. The two-dimensional FIFO of claim 14, wherein each of the different portions comprises a byte of data.

25. The two-dimensional FIFO of claim 14, wherein the group of data is broken up into N different portions of M bits each, and the arrays of one-dimensional FIFO memory banks includes N one-dimensional FIFO memory banks.

26. A storage medium encoded with a machine readable computer program code for processing data in a FIFO memory, the storage medium including instructions for causing a computer to implement a method, the method comprising:

receiving a fist group of data;

directing different portions of the first group of data to different one-dimensional FIFO memory banks, the different one-dimensional FIFO memory banks being part of an array of one-dimensional FIFO memory banks;

updating a write pointer to indicate a next one-dimensional FIFO memory bank in the array of one-dimensional FIFO memory banks;

receiving a second group of data; and directing at least a portion of the second group of data to the next one-dimensional FIFO memory bank indicated by the write pointer.

27. A computer data signal for processing data in a FIFO memory, the computer data signal comprising code configured to cause a processor to implement a method, the method comprising:

receiving a first group of data;

directing different portions of the first group of data to different one-dimensional FIFO memory banks, the different one-dimensional FIFO memory banks being part of an array of one-dimensional FIFO memory banks;

updating a write pointer to indicate a next one-dimensional FIFO memory bank in the array of one-dimensional FIFO memory banks;

receiving a second group of data; and directing at least a portion of the second group of data to the next one-dimensional FIFO memory bank indicated by the write pointer.

* * * * *

UNITED STATES PATENT AND TRADEMARK OFFICE
CERTIFICATE OF CORRECTION

PATENT NO. : 6,556,495 B2
DATED : April 29, 2003
INVENTOR(S) : Vincenzo Condorelli et al.

Page 1 of 2

It is certified that error appears in the above-identified patent and that said Letters Patent is hereby corrected as shown below:

Column 2,
Delete table and equations,
"

|  | SELECT (0:S-1, S = log₂ N) | | | | | | |
|---|---|---|---|---|---|---|---|
|  | 0 | 1 | 2 | ... | S-3 | S-2 | S-1 |
| BANK N-1 | $D_{N-1}$ | $D_{N-2}$ | $D_{N-3}$ | ... | D2 | D1 | D0 |
| BANK N-2 | $D_{N-2}$ | $D_{N-3}$ | $D_{N-4}$ | ... | D1 | D0 | $D_{N-1}$ |
| BANK N-3 | $D_{N-3}$ | $D_{N-4}$ | $D_{N-5}$ | ... | D0 | $D_{N-1}$ | $D_{N-2}$ |
| . | . | . | . |  | . | . | . |
| BANK 2 | D2 | D1 | D0 | ... | D5 | D4 | D3 |
| BANK 1 | D1 | D0 | $D_{N-1}$ | ... | D4 | D3 | D2 |
| BANK 0 | D0 | $D_{N-1}$ | $D_{N-2}$ | ... | D3 | D2 | D1 |

WR_DATA_SEL <= WR_EXTRA_OFFSET · WR_VERT_PTR
RD_BEN_DATA_SEL <= RD_BEN_EXTRA_OFFSET ·
RD_VERT_PTR
WR_VERT_PTR IS INCREMENTED BY THE NUMBER OF WORDS
WRITTEN IN THE FIFO
· "EACH IN DATA X" CONSISTS OF A CORRESPONDING DATA
W OF PARITY BIT RDBEnX AND WRBEnX.

| WR_EXTRA_OFFSET | POSITION OF FIRST 1 IN WR_BEn |
|---|---|
| 0 | 0 |
| N-1 | 1 |
| N-2 | 2 |
| N-3 | 3 |
| 3 | N-3 |
| 2 | N-2 |
| 1 | N-1 |

| RD_BEN_EXTRA_OFFSET | POSITION OF FIRST 1 IN RD_BEn |
|---|---|
| 0 | 0 |
| N-1 | 1 |
| N-2 | 2 |
| N-3 | 3 |
| 3 | N-3 |
| 2 | N-2 |
| 1 | N-1 | and insert therefor
--

|  | SELECT (0:S-1, S = log₂ N) | | | | | | |
|---|---|---|---|---|---|---|---|
|  | 0 | 1 | 2 | ... | S-3 | S-2 | S-1 |
| BANK N-1 | $D_{N-1}$ | $D_{N-2}$ | $D_{N-3}$ | ... | D2 | D1 | D0 |
| BANK N-2 | $D_{N-2}$ | $D_{N-3}$ | $D_{N-4}$ | ... | D1 | D0 | $D_{N-1}$ |
| BANK N-3 | $D_{N-3}$ | $D_{N-4}$ | $D_{N-5}$ | ... | D0 | $D_{N-1}$ | $D_{N-2}$ |
| BANK 2 | D2 | D1 | D0 | ... | D5 | D4 | D3 |
| BANK 1 | D1 | D0 | $D_{N-1}$ | ... | D4 | D3 | D2 |
| BANK 0 | D0 | $D_{N-1}$ | $D_{N-2}$ | ... | D3 | D2 | D1 |

WR_DATA_SEL <= WR_EXTRA_OFFSET + WR_VERT_PTR
RD_BEN_DATA_SEL <= RD_BEN_EXTRA_OFFSET + RD_VERT_PTR
WR_VERT_PTR IS INCREMENTED BY THE NUMBER OF WORDS
WRITTEN IN THE FIFO
* EACH "IN DATA X" CONSISTS OF A CORRESPONDING DATA W OF
PARITY BIT. RDBEnX AND WRBEnX.

| WR_EXTRA_OFFSET | POSITION OF FIRST 1 IN WR_BEn |
|---|---|
| 0 | 0 |
| N-1 | 1 |
| N-2 | 2 |
| N-3 | 3 |
| 3 | N-3 |
| 2 | N-2 |
| 1 | N-1 |

| RD_BEN_EXTRA_OFFSET | POSITION OF FIRST 1 IN RD_BEn |
|---|---|
| 0 | 0 |
| N-1 | 1 |
| N-2 | 2 |
| N-3 | 3 |
| 3 | N-3 |
| 2 | N-2 |
| 1 | N-1 |

--

UNITED STATES PATENT AND TRADEMARK OFFICE
CERTIFICATE OF CORRECTION

PATENT NO. : 6,556,495 B2
DATED : April 29, 2003
INVENTOR(S) : Vincenzo Condorelli et al.

It is certified that error appears in the above-identified patent and that said Letters Patent is hereby corrected as shown below:

Column 7,
Line 25, after "memory" delete "bank," and insert therefor -- banks, --
Line 26, after "memory" delete "barks" and insert therefor -- banks --
Line 37, after "banks" delete "include:" and insert therefor -- includes: --

Column 9,
Line 20, after "the" delete "arrays" and nsert therefor -- array --
Line 27, after "a" delete "fist" and insert therfor -- first --

Signed and Sealed this

Twenty-first Day of September, 2004

JON W. DUDAS
*Director of the United States Patent and Trademark Office*